United States Patent
Lyadvinsky et al.

(10) Patent No.: US 10,691,438 B1
(45) Date of Patent: *Jun. 23, 2020

(54) ACCESS FREQUENCY-BASED FILE MANAGEMENT IN VIRTUALIZED COMPUTING ENVIRONMENTS USING SPARSE FILES

(71) Applicant: Parallels International GmbH, Schaffhausen (CH)

(72) Inventors: Maxim Lyadvinsky, Moscow (RU); Nikolay Dobrovolskiy, Moscow (RU); Serguei M. Beloussov, Singapore (SG)

(73) Assignee: Parallels International GmbH, Schaffhausen (CH)

( * ) Notice: Subject to any disclaimer, the term of this patent is extended or adjusted under 35 U.S.C. 154(b) by 169 days.

This patent is subject to a terminal disclaimer.

(21) Appl. No.: 15/409,345

(22) Filed: Jan. 18, 2017

(51) Int. Cl.
  *G06F 8/61* (2018.01)
  *H04L 29/08* (2006.01)
  *G06F 9/455* (2018.01)

(52) U.S. Cl.
  CPC .......... *G06F 8/63* (2013.01); *G06F 9/45558* (2013.01); *H04L 67/06* (2013.01); *H04L 67/1097* (2013.01); *G06F 2009/4557* (2013.01)

(58) Field of Classification Search
  None
  See application file for complete search history.

(56) References Cited

U.S. PATENT DOCUMENTS

| | | |
|---|---|---|
| 8,612,284 B1 | 12/2013 | Sharif et al. |
| 9,348,819 B1 | 5/2016 | Emelyanov et al. |
| 2003/0140207 A1* | 7/2003 | Nagase ................ G06F 3/061 711/167 |
| 2012/0254116 A1 | 10/2012 | Thereska et al. |
| 2012/0304168 A1* | 11/2012 | Raj Seeniraj .......... G06F 9/452 718/1 |
| 2013/0159637 A1 | 6/2013 | Forgette et al. |
| 2014/0006465 A1* | 1/2014 | Davis ............... G06F 17/30194 707/827 |
| 2015/0186060 A1* | 7/2015 | Kurtin .............. G06F 17/30235 711/114 |

* cited by examiner

*Primary Examiner* — Meng Ai T An
*Assistant Examiner* — Zujia Xu
(74) *Attorney, Agent, or Firm* — Lowenstein Sandler LLP

(57) ABSTRACT

The subject matter of this specification can be implemented in, among other things, a method that includes receiving, from within a guest operating system hosted by a host operating system at a computer system, requests to access sparse files within a guest file system of the guest operating system. The sparse files each correspond to an external data file outside the guest file system. Each of the requests to access the sparse files within the guest file system is directed to the corresponding external data file outside the guest file system. The method includes identifying a frequency with which each of the sparse files is accessed. The method includes moving an external data file from a first type of storage device to a second type of storage device based on the frequency with which the external data file is accessed relative to others of the external data files.

20 Claims, 5 Drawing Sheets

ACCESS FREQUENCY-BASED FILE MANAGEMENT IN VIRTUALIZED COMPUTING ENVIRONMENTS USING SPARSE FILES

TECHNICAL FIELD

This instant specification relates to distributing a disk image for a virtual desktop environment.

BACKGROUND

Desktop virtualization can be performed by software that separates a desktop environment and associated application software from a physical client device that is used to access the desktop environment and the application software. The virtual desktop environment may be accessed by a client device that is remote from a server device that hosts the virtual desktop environment. Alternatively, the virtual desktop environment may be accessed locally from a client device that hosts the virtual desktop environment. Access to the virtual desktop environment may be constant or intermittent. The virtual desktop environment may persist between sessions that connect to the virtual desktop environment or the virtual desktop environment may reset between the sessions. Virtualization may be used to present independent instances of desktop environments to multiple users.

DETAILED DESCRIPTION

Figure 1:
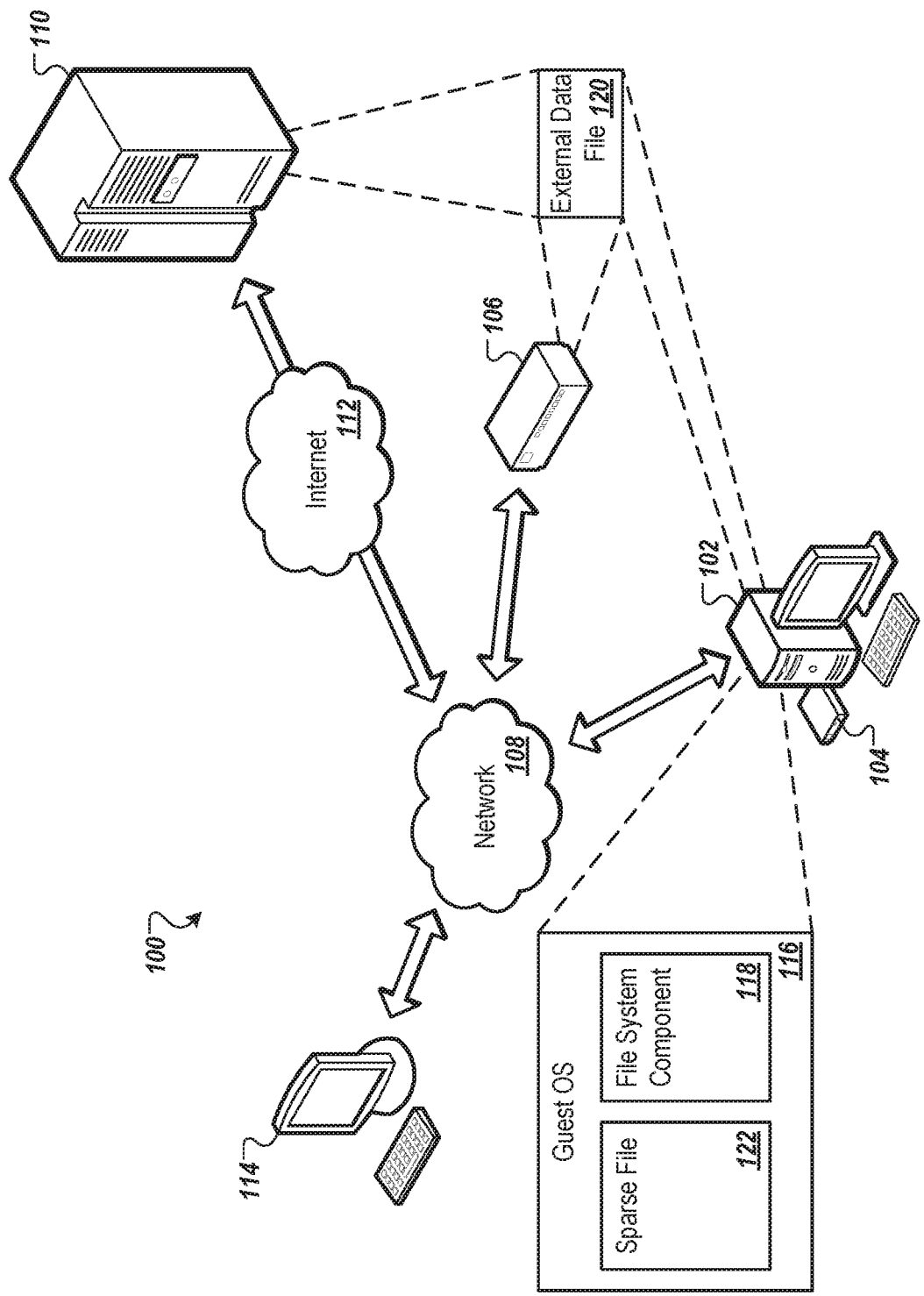
FIG. 1 is a schematic diagram that shows an example of a system for distributing an image for a virtual desktop environment.

This document describes systems and techniques for distributing a disk image for a virtual desktop environment. The amount of space available in a guest file system within the virtual desktop environment may be limited. In addition, where multiple instances of virtual desktop environments use files that have the same contents, the same data may be stored multiple times. This causes more storage to be used than what is needed to support the instances of the virtual desktop environments. Furthermore, where multiple types of storage devices are used, frequently accessed files may be inefficiently stored on devices with slow access times and infrequently accessed files may be needlessly stored on devices with fast access times.

Aspects of the present disclosure address the above and other deficiencies by distributing the storage of one or more files from a disk image of a guest operating system in a virtual desktop environment to a storage that is outside the virtual desktop environment on the same computer device, a connected storage device, or another computer device. The guest operating system may continue to access the files stored outside the virtual desktop environment by accessing placeholder files within the virtual desktop environment that redirect the access to the corresponding files stored outside the virtual desktop environment. The placeholder functionality may be provided by sparse files. In some implementations, the sparse files are empty and do not contain data. The files stored outside the virtual desktop environment (referred to hereafter as "external data files") may contain the data that corresponds to the sparse files. This data may be, for example, data that was stored in a file within the virtual desktop environment prior to the file being moved outside the virtual desktop environment and replaced by a sparse file within the virtual desktop environment.

In some implementations, the system may automatically move a file from the guest file system to an external data file or the system may automatically move an external data file from one storage device to another. The system may determine the frequency with which the sparse files are accessed. The system may automatically move external data files for frequently accessed sparse files to storage devices with comparatively fast access speeds and may move external data files for infrequently accessed sparse files to storage devices with comparatively slow access speeds. The system may also measure the access speeds of the storage devices to determine where to move the external data files.

The systems and techniques described here may provide one or more of the following advantages. The system may provide a reduction in the amount of storage space used where multiple guest operating systems have sparse files that redirect to a same external data file in a host operating system as the same external data file is only stored once rather than multiple copies corresponding to the multiple guest operating systems. The system may provide for optimized use of different types of storage by updating a sparse file in the guest operating system when a corresponding external data file in the host operating system is moved, for example, from one type of storage device to another type of storage device, such as between one or more of a local disk, an external disk (e.g., a Universal Serial Bus drive), a network shared disk (e.g., over a local area network using Ethernet or Wi-Fi), or a cloud storage. The system may provide for automatically optimized use of the different types of storage by collecting data file usage and storage device speed information, and automatically moving the external data file outside the guest operating system from the first type of storage device to the second type of storage device based on the usage and speed information.

FIG. 1 is a schematic diagram that shows an example of a system 100 for distributing a disk image of a virtual desktop environment. The system 100 includes a computer system 102 or computer device. The computer system 102 includes one or more local storage devices within the computer system 102. The computer system 102 executes a host operating system that may access hardware resources at the computer system 102, such as one or more processing devices, one or more memories, and/or the local storage devices. A hypervisor executes within, or on top of the host operating system. The hypervisor provides a guest operating system 116 within each virtual machine with a virtual operating platform and manages the execution of the guest operating system 116. The virtual operating platform provides the guest operating system 116 with access to one or more of the hardware resources as virtualized hardware resources. In some implementations, multiple instances of multiple types of guest operating systems may share the virtualized hardware resources, such as Linux, Windows, and OS X instances, and the instances may run on a single physical x86 computer system.

The computer system 102 may have an external storage device 104 in communication with the computer system 102, for example, by a Universal Serial Bus (USB), Small Computer System Interface (SCSI), IEEE 1394 (or FireWire) connection, or Thunderbolt connection. The computer system 102 may be in communication with a network shared storage device 106 over a network 108, such as a local area network (LAN), a wide area network (WAN), and/or one of more of the computer devices that make up the Internet. The computer system 102 may be in communication with a cloud storage system 110 over the network 108 and/or a second network 112, such as the Internet.

An application within the guest operating system 116 or a component of the guest operating system may make a request to create a file within a guest file system for the guest operating system 116 in the virtual desktop environment and/or virtual machine. The guest operating system 116 passes the request through the virtual operating platform to the hypervisor or a file system component 118 within the guest operating system 116. The hypervisor and/or the file system component 118 creates an external data file 120 in a host file system of the host operating system or in a storage device in communication with the computer system 102 outside the guest operating system 116, the virtual desktop environment, and/or the virtual machine, such as the external storage device 104, the network shared storage device 106, and/or the cloud storage system 110.

The hypervisor and/or the file system component 118 then instructs the guest operating system 116 to create a sparse file 122 in the guest file system that corresponds to the external data file 120 in the host file system. The hypervisor and/or the file system component 118 may instruct the guest operating system 116 to include metadata within the sparse file 122, or in another storage location within the guest file system, that allows the hypervisor and/or the file system component 118 to later access the external data file 120, such as an identifier of the external data file 120. Alternatively or in addition, the hypervisor and/or the file system component 118 may store the metadata for the sparse file 122 in the host file system. Alternatively or in addition, the hypervisor and/or the file system component 118 may retrieve the external data file 120 by using a same name, path, folder structure, and/or other identifier of the sparse file 122 from the metadata for the sparse file 122 as a name, path, folder structure, and/or other identifier of the external data file 120 used to access the external data file 120.

A sparse file is a type of computer file that a computer system may use to attempt to use storage space in a file system more efficiently when the computer file may have portions or blocks that are empty, not initialized, values of zero, or another default value or value that the blocks have in common. Metadata that represents the empty portions is written to the sparse file instead of writing values for the actual empty portions. This may result in the sparse file occupying less space in the file system (e.g., the physical file size on disk) than the sparse file would have occupied if values for the empty portions had been written to the sparse file (e.g., the logical file size). The full block size for a portion is written to disk as the actual size when the block contains real or non-empty data.

When a sparse file is read, the file system, such as Unix variants, New Technology File System (NTFS), Hierarchical File System Plus (HFS+), and/or Apple File System (APFS), may convert the metadata representing the empty blocks into real blocks filled with zero (or default and/or common) bytes at runtime and provides the converted file to an application that requested the read operation. The application making the request to read the sparse file may be unaware of the conversion.

When the sparse file 122 from a guest file system in the guest operating system 116 is read from, the hypervisor and/or the file system component 118 handles the request. The hypervisor and/or the file system component 118 may use the metadata for the sparse file 122 to determine which external data file to retrieve from the host file system in the host operating system or from another storage device and/or storage system. Similarly, when the sparse file 122 from a guest file system in the guest operating system 116 is written to, the hypervisor and/or the file system component 118 handles the request. The hypervisor and/or the file system component 118 may use the metadata for the sparse file 122 to determine the external data file 120 to write to in the host file system in the host operating system or to another storage device and/or storage system, and performs the operations to write the requested data to the external data file 120.

In some implementations, the external data file 120 outside the guest file system may also be a sparse file. Accordingly, the hypervisor and/or a host operating system may read metadata from the external data file 120 to determine how to convert the metadata representing the empty blocks in the external data file 120 into real blocks filled with zero (or default and/or common) bytes at runtime. In the case of a read operation, the hypervisor then provides the result to the guest operating system 116, which provides the result to the application in the guest operating system 116 that made the request for the file. In the case of a write operation, the hypervisor then writes the requested data to the proper location in the resulting file. The hypervisor and/or the host operating system may then convert the resulting file with the written data back into a sparse file format before saving the changes to the external data file 120.

The hypervisor and/or the guest operating system 116 may receive an input, for example from a user, that requests that the external data file 120 be moved from the local storage device, the external storage device 104, the network shared storage device 106, or the cloud storage system 110 to another of the local storage device, the external storage device 104, the network shared storage device 106, or the cloud storage system 110. The hypervisor may move the external data file 120 to the requested storage location. The hypervisor and/or the guest operating system 116 may update the metadata for the sparse file 122 to include an identifier of the requested storage location. The hypervisor will then redirect subsequent requests to access the sparse file 122 to the requested storage location according to the identifier of the external data file 120 and/or the requested storage location in the updated metadata.

In some implementations, the virtual desktop environment at the computer system 102 may be accessed remotely from a remote console device 114. The remote console device 114 may communicate with a server for the virtual desktop environment at the computer system 102. The server may receive user inputs from the remote console device 114 and update a state of the virtual desktop environment at the computer system 102 accordingly.

Figure 2:
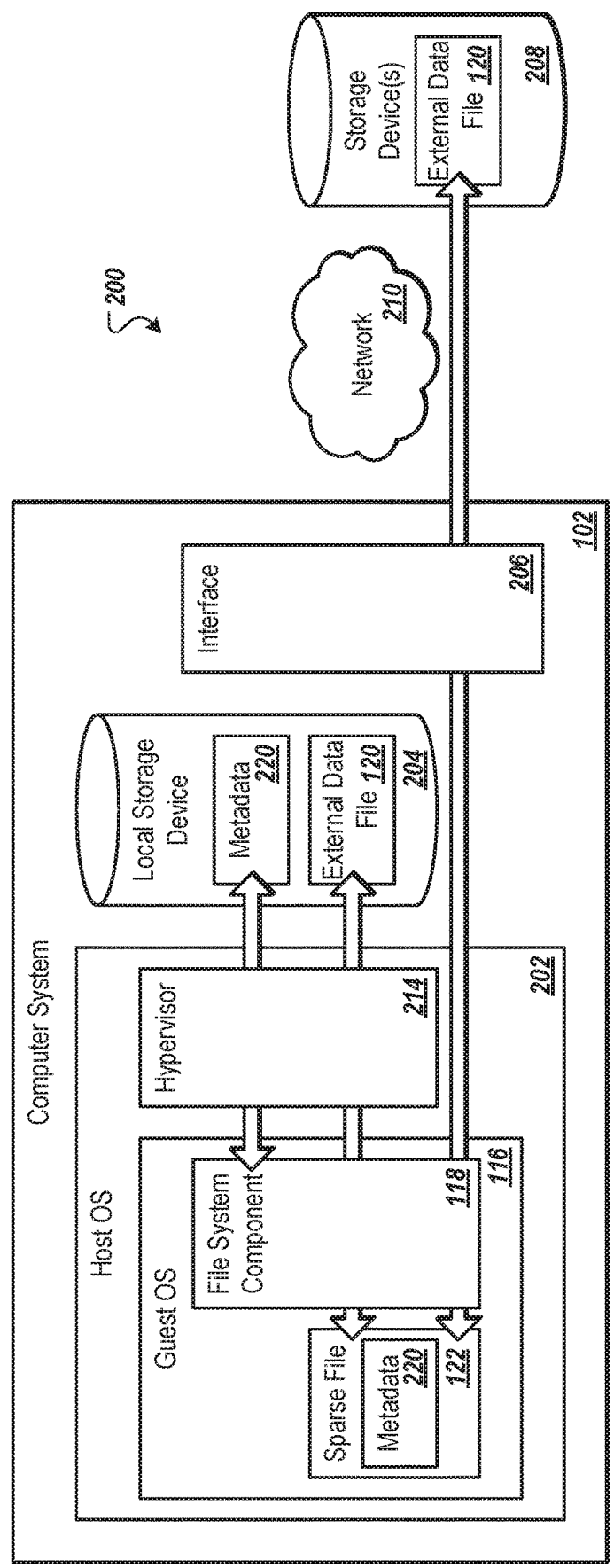
FIG. 2 is a block diagram that shows an example of a system for distributing a disk image of a virtual desktop environment.

FIG. 2 is a block diagram that shows an example of a system 200 for distributing a disk image of a virtual desktop environment. The system 200 includes the computer system 102. The computer system 102 executes a host operating system 202. The host operating system 202 provides access to physical resources of the computer system 102, such as a local storage device 204 and an interface 206. The interface 206 provides communication with one or more storage devices 208, such as the external storage device 104 over a direct connection, the network shared storage device 106 over the network 108, and/or the cloud storage system 110 over the network 108 and/or the second network 112.

The host operating system 202 executes the guest operating system 116 and a hypervisor 214. The hypervisor 214 manages the guest operating system 116. The hypervisor 214 also virtualizes access to the physical resources (e.g., the local storage device 204, the interface 206, and/or the storage devices 208). For example, an application or a component of the guest operating system 116 executing within a virtual machine and/or virtual desktop environment in the guest operating system 116 may make a request to the guest operating system 116 that a file be created in a guest file system of the guest operating system 116 within a virtualized storage device that maps to a physical storage device, such as the local storage device 204, the external storage device 104, the network shared storage device 106, and/or the cloud storage system 110.

The guest operating system 116 may include the file system component 118 that receives the request to create the file. The file system component 118 may be a file system driver that intercepts or traps file input and/or output (I/O) requests to access the guest file system before they are processed by the guest operating system 116. For example, the file system component 118 may be a file system filter driver or minifilter driver within an instance of the Windows operating system provided by Microsoft. Alternatively or in addition, the file system component 118 may be a component of a file system for another type of operating system, such as a virtual file system or a filesystem in userspace (FUSE) in a Unix-like operating system. The application and/or component provide data for the creation of the file to the file system component 118.

The file system component 118 may determine that the file to be created is to be stored outside the guest file system. For example, the file system component 118 may receive a user input indicating that the file is to be stored outside the guest file system or the file system component 118 may be configured to apply one or more criteria to the file to be created to determine if the file is to be created outside the guest file system (e.g., a size of the file or a frequency of usage of the file is above or below a threshold size or frequency of usage). If the file system component 118 determines that the file to be created is to be stored outside the guest file system, such as in the host file system or the storage devices 208, then the file system component 118 may communicate with the hypervisor 214 to store the data in the external data file 120 in the local storage device 204 for a host file system of the host operating system 202 or in one of the storage devices 208.

Alternatively or in addition, if the file system component 118 determines that the file to be created is to be stored outside the guest file system, then the file system component 118 may communicate with one or more of the storage devices 208 over a network 210 to store the external data file 120 at the storage device, for example, over the network 210. In some implementations, the file system component 118 communicates directly with the storage device over the network 210 (e.g., through a virtual interface that maps to the interface 206) without communicating with the hypervisor 214. For example, the file system component 118 may use a network protocol for transferring files directly to the storage device over the network 210, such as Samba, file transfer protocol (FTP), or an application programming interface (API) to a cloud storage service (e.g., Dropbox or Amazon S3).

Otherwise, if the file system component 118 determines that the file to be created is to be stored inside the guest file system, then the file system component 118 may allow the guest operating system 116 to handle the request to create the file in the guest file system. For example, the file system component 118 may determine that a user input has not been received requesting that the file be stored outside the guest file system, there is enough space within the guest file system for the file, a size of the file is below a threshold size, and/or an expected frequency of usage of the file is below a threshold frequency of usage.

The hypervisor 214 and/or the file system component 118 store the sparse file 122 in the guest file system of the guest operating system 116 if the external data file 120 is stored outside the guest file system. The hypervisor 214 and/or the file system component 118 may store an identifier of the external data file 120 in a metadata 220 for the sparse file 122. Alternatively or in addition, the hypervisor 214 may provide the identifier to the file system component 118 and the file system component 118 may store the identifier in the metadata 220. The hypervisor 214 and/or the file system component 118 may use the identifier in the metadata 220 to associate the sparse file 122 with the external data file 120.

Storing the identifier in the metadata 220 may include, for example, the hypervisor 214 and/or the file system component 118 storing a mapping between the sparse file 122 and the external data file 120 in the guest file system and/or in the host file system. Alternatively or in addition, storing the identifier in the metadata 220 may include the file system component 118 and/or the hypervisor 214 storing the external data file 120 in a location within the local storage device 204 in the host file system that has a same path or folder structure as the sparse file 122 within the guest file system.

For example, the hypervisor 214 and/or the file system component 118 may store the sparse file 122 at "C:\Users\ExampleUser\Desktop\mydata.txt" in an instance of the Windows operating system and the external data file 120 at "/Users/ExampleUser/VMs/GuestOS/C/Users/ExampleUser/Desktop/mydata.txt" in an instance of a Unix-like operating system, such as MacOS or Linux. In this example, the path to the external data file 120 in the host file system includes a same path as the path in the guest file system to the sparse file 122. The sparse file 122 and the external data file 120 have a same file name, "mydata.txt." The hypervisor 214 and/or the file system component 118 may replace forward slashes with backward slashes and vice versa in the paths to the sparse file 122 and the external data file 120 when the sparse file 122 and the external data file 120 are stored in different types of operating systems. The hypervisor 214 and/or the file system component 118 may also replace drive letters (e.g., "C:") with a folder name (e.g., "C") and vice versa. The hypervisor 214 may store the external data file 120 in a default root folder (e.g., "/Users/ExampleUser/VMs/GuestOS/"), which is in a "Users" folder for a user named "ExampleUser." The default root folder may also include further sub-folders for the instance of the virtual machine that hosts the virtual environment and the instance of the guest operating system 116.

The guest operating system 116 may then receive a request to access the sparse file 122 from an application or component of the guest operating system 116 within the guest operating system 116. The guest operating system 116 may provide the metadata 220 related to the sparse file 122 in the guest file system to the hypervisor 214 where the identifier in the metadata 220 is used to identify the external data file 120 in the local storage device 204 and/or the external storage device 104 of the host file system. Alternatively or in addition, the hypervisor 214 may retrieve the metadata 220 for the sparse file 122 from the guest file system or the host file system. The hypervisor 214 uses the identifier in the metadata 220 to locate and access the external data file 120 in the local storage device 204, the external storage device 104, and/or the storage devices 208.

Where the external data file 120 is located at one of the storage devices 208 over the network 210, the file system component 118 may locate and access the external data file 120 for the request without going through the hypervisor 214. For example, the file system component 118 may use the identifier in the metadata 220 stored in the sparse file 122 or elsewhere in the guest file system to locate the external data file 120 in the storage devices 208.

In the case of read access, the hypervisor 214 and/or file system component 118 provide the located portion of the external data file 120 to the guest operating system 116. The guest operating system 116 then passes the located portion to the requesting application and/or component. In the case of write access, the hypervisor 214 and/or the file system component 118 write data from the request to the located portion of the external data file 120.

The hypervisor 214, the host operating system 202, and/or the guest operating system 116 may receive a request to move a file in the guest file system or the external data file 120 outside the guest file system, for example, from a user in a user input through a user interface. The user may request the move, for example, when space is needed for other files where the file in the guest file system or the external data file 120 is currently stored. The request may include an identifier of a destination storage device and/or storage location for the external data file 120 in the local storage device 204, the external storage device 104, and/or one of the storage devices 208. The host operating system 202 may provide the request to the hypervisor 214. The hypervisor 214 then moves the file in the guest file system or the external data file 120 from the initial location to the requested location in the local storage device 204, the external storage device 104, and/or one of the storage devices 208. Alternatively or in addition, the file system component 118 may move the file in the guest file system or the external data file 120 from the initial location to the requested location in one of the storage devices 208 over the network 210. The hypervisor 214 and/or the file system component 118 may update the metadata 220 for the sparse file 122 corresponding to the external data file 120 to include an identifier of the new location of the external data file 120 in the storage devices 208.

The hypervisor 214, the host operating system 202, and/or the guest operating system 116 may receive a request to replace the sparse file 122 in the guest file system with the external data file 120 from the host file system, for example, from a user in a user input through a user interface. The user may make the request, for example, when the user wants the disk image for the guest file system to include all of the files internally so that the disk image may be moved to another computer device. The host operating system 202 may provide the request to the hypervisor 214. The hypervisor 214 then replaces the sparse file 122 in the guest file system with the external data file 120 from the host file system in the local storage device 204 or from the storage devices 208. Alternatively or in addition, the file system component 118 may replace the sparse file 122 in the guest file system with the external data file 120 from one of the storage devices 208. The hypervisor 214 and/or the file system component 118 may remove any stored mapping that mapped the identifier from the metadata 220 for the sparse file 122 to an identifier of the external data file 120. In some implementations, replacing sparse files with corresponding external data files may allow a disk image of the virtual desktop environment for the guest operating system 116 to be backed up or instantiated on another computer device that may not have access to external data files that are not included in the disk image.

Figure 3A:
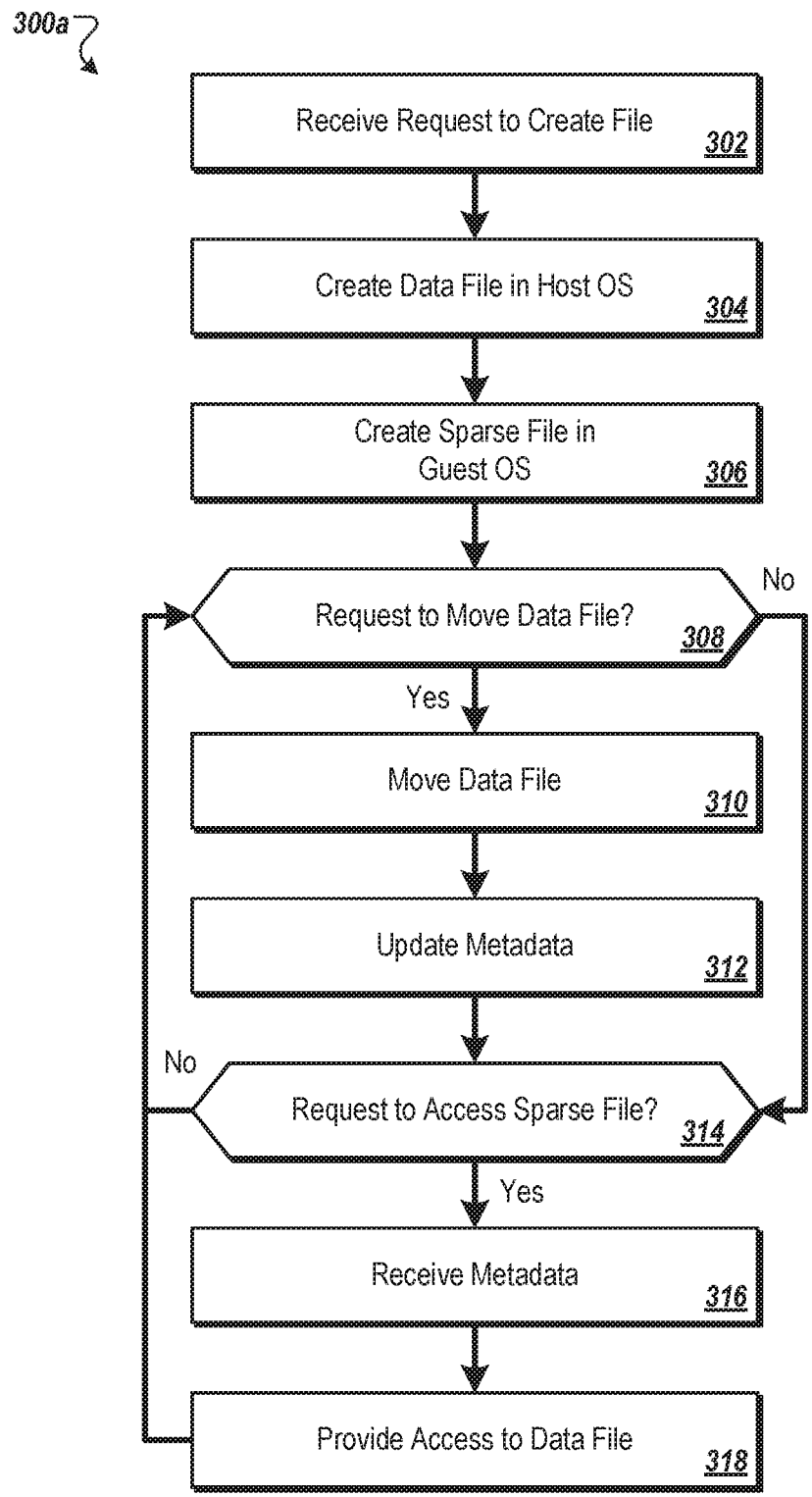
FIGS. 3A-B are flow charts that show examples of processes for distributing a disk image of a virtual desktop environment.
Figure 3B:
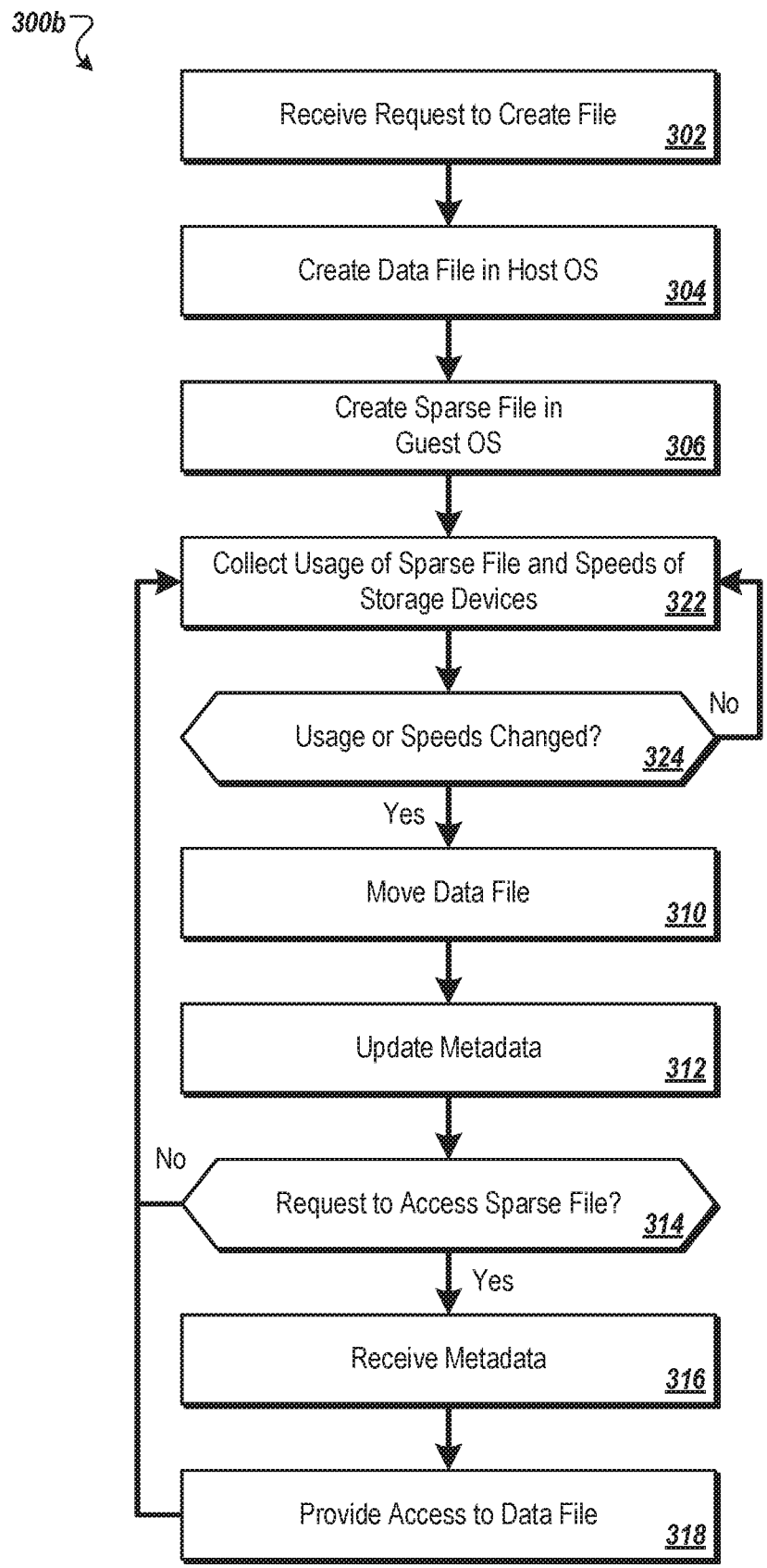

FIGS. 3A-B are flow charts that show examples of one or more processes 300a-b for distributing a disk image of a virtual desktop environment, in accordance with some aspects of the same disclosure. The processes 300a-b may be performed, for example, by a system such as the system 100 and the system 200. For clarity of presentation, the description that follows uses the system 100 and the system 200 as examples for describing the processes 300a-b. However, another system, or combination of systems, may be used to perform the processes 300a-b.

Referring to FIG. 3A, the process 300a begins, at box 302, with receiving, from within a guest operating system, a request to create a data file in a guest file system of the guest operating system. For example, the file system component 118 may receive a request to create a file in the guest file system from the application and/or component within the virtual machine and/or virtual desktop environment for the guest operating system 116.

In response to the receipt of the request to create the data file, the process 300a includes creating, at box 304, an external data file in a first storage device outside the guest operating system and creating, at box 306, a sparse file in the guest file system. A host operating system hosts the guest operating system. The sparse file (or a storage location outside the sparse file, such as the guest file system and/or the host file system) may store metadata that directs requests to access the sparse file from within the guest operating system to the external data file in the first storage device. The sparse file may be empty other than the metadata that may be stored in the sparse file.

For example, the file system component 118 may pass the request to the hypervisor 214. The hypervisor 214 may create the external data file 120 in the local storage device 204 within the host file system. Alternatively or in addition, the file system component 118 may create the external data file 120 in one of the storage devices 208 outside the guest operating system 116. The file system component 118 and/or the hypervisor 214 may create the sparse file 122 in the guest file system. The sparse file 122 or a data storage location outside the sparse file 122 may include the metadata 220 that directs requests to access the sparse file 122 from within the guest operating system 116 to the external data file 120 in the local storage device 204. The data storage location outside the sparse file 122 may be in the guest file system and/or the host file system, for example, in the local storage device 204.

At box 308, if a request to move the external data file from a first storage device to a second storage device is received, then the process 300a includes moving, at box 310, the external data file from the first storage device to the second storage device and may include updating, at box 312, the metadata for the sparse file to direct requests to access the sparse file from within the guest operating system to the external data file in the second storage device. If no request to move the external data file from a first storage device to a second storage device is received, then the process 300a may proceed to box 314.

For example, the file system component 118 and/or the hypervisor 214 may receive a user input requesting that the external data file 120 be moved from the local storage device 204 to one of the storage devices 208. In response, the hypervisor 214 may move the external data file 120 from the local storage device 204 to one of the storage devices 208 and may update the metadata 220 for the sparse file 122 to reflect the new location of the external data file 120.

At box 314, if a request to access the sparse file is received from within the guest operating system, then the process 300a may include receiving, at box 316, the metadata for the sparse file and may include providing, at box 318, access to the external data file in the first storage device based on the metadata. Storing the identifier in the metadata may include storing an association between the sparse file and the external data file in a mapping or lookup table. Alternatively or in addition, storing the identifier in the metadata may include using a same path or folder structure of the sparse file for determining a location of the external data file. The request to access the sparse file may include a request to read the sparse file and providing access to the external data file may include providing data from the external data file in the first storage device. The request to access the sparse file may include a request to write to the sparse file and providing access to the external data file may include writing data to the external data file in the first storage device. If no request to access the sparse file is received from within the guest operating system, then the process 300a may return to box 308.

For example, the file system component 118 may receive a request from the application and/or component in the guest operating system 116 to access the sparse file 122 in the guest file system. The file system component 118 may pass the request to the hypervisor 214. The hypervisor 214 may receive the request and/or the metadata 220 from the guest operating system 116. Alternatively or in addition, the hypervisor 214 may retrieve the metadata 220 from the sparse file 122, the guest file system, and/or the host file system. The file system component 118 and/or the hypervisor 214 may use an identifier of the external data file 120 in the metadata 220 to locate the external data file 120 in the local storage device 204 or one of the storage devices 208. Alternatively or in addition, the file system component 118 and/or the hypervisor 214 may use an identifier of the sparse file 122 to lookup an identifier or location of the external data file 120 in the metadata 220. Alternatively or in addition, the file system component 118 and/or the hypervisor 214 may use a path or folder structure of the sparse file 122 in the metadata 220 to locate the external data file 120. In the case of a read request, the file system component 118 and/or the hypervisor 214 provide the requested portion of the external data file 120 to the requesting application and/or component. In the case of a write request, the file system component 118 and/or the hypervisor 214 writes the provided data into a requested portion of the external data file 120.

In some implementations, failing to provide access to the external data file in the first storage device may result in requesting a location of the external data file (e.g., by prompting a user for a user input that selects a location) and receiving the location of the external data file in a second storage device. In response to the receipt of the location of the external data file, the process 300a may include updating the metadata for the sparse file to direct requests to access the sparse file from within the guest operating system to the external data file in the second storage device.

For example, the file system component 118 and/or the hypervisor 214 may fail to provide a requested portion of the external data file 120 to the guest operating system 116 and the requesting application and/or component. The hypervisor 214, the guest operating system 116, and/or the host operating system 202 may present a user interface to the user requesting a user input to select a location for the external data file 120. The user may provide the user input selection and the hypervisor 214 may update the metadata 220 based on the new location in the user input selection. The file system component 118 and/or the hypervisor 214 may provide the requested portion of the external data file 120 from the new location in the storage devices 208 and/or write data to the requested portion of the external data file 120 at the new location in the storage devices 208.

One or more of the operations in the process 300a may be repeated. For example, the process 300a may include receiving another request to create a file, at box 302, creating another external data file, at box 304, and creating another corresponding sparse file, at box 306.

Referring to FIG. 3B, the process 300b may include receiving requests to create files, at box 302, creating external data files, at box 304, and creating corresponding sparse files, at box 306, as described with respect to FIG. 3A. The process 300b includes collecting, at box 322, usage of the sparse files and may also include collecting speeds of the storage devices.

Collecting usage of the sparse files may include receiving requests to access the sparse files and storing a record of the requests to access the sparse files. The process 300b may include repeatedly collecting, at box 322, the usage information for the sparse files. For example, the file system component 118 and/or the hypervisor 214 may repeatedly receive requests to access the sparse file 122 and other sparse files that correspond to external data files outside the guest file system for the guest operating system 116. The file system component 118 and/or the hypervisor 214 may then store a record of the requests to access the sparse files in the guest file system or the host file system (e.g., in the local storage device 204 or one of the storage devices 208).

Collecting speeds of the storage devices may include measuring the access speeds for the storage devices. The storage devices may have different types, such as the local storage device 204, the external storage device 104, the network shared storage device 106, and the cloud storage system 110. The access speeds may be based on a rate of throughput or bandwidth between the guest operating system 116 and the storage device and/or a latency of communication between the guest operating system 116 and the storage device. The process 300b may also include repeatedly collecting the speed information. For example, the file system component 118 and/or the hypervisor 214 may repeatedly or periodically measure the access speeds of the local storage device 204, the external storage device 104, the network shared storage device 106, and the cloud storage system 110 and store the measured access speeds.

If, at box 324, the process 300b includes determining that the usage or access speeds have changed, then the process 300b includes moving an external data file, at box 310, and may include updating metadata for a corresponding sparse file, at box 312, as described with respect to FIG. 3A. For example, the file system component 118 and/or the hypervisor 214 may determine from the stored records of access requests that the sparse file 122 is being accessed more frequently than other sparse files. In response, the file system component 118 and/or the hypervisor 214 may move the external data file 120 from a comparatively slow type of storage, such as the network shared storage device 106 or the cloud storage system 110, to a comparatively fast type of storage, such as the local storage device 204 or the external storage device 104.

In some implementations, the storage devices may be ranked based on the type of each storage device. The type may include, for example, a type that is connected to a system bus within the computer system 102 (e.g., the local storage device 204), a type that is connected to the computer system 102 as a peripheral device (e.g., the external storage device 104), a type that is in communication with the computer system 102 over a local or semi-local network (e.g., the network shared storage device 106), or a type that is in communication with the computer system 102 over a wide area network or the Internet (e.g., the cloud storage system 110).

In some implementations, the storage devices may be ranked based on the measured access speeds of the storage devices. For example, the file system component 118 and/or the hypervisor 214 may order or rank the local storage device 204, the external storage device 104, the network shared storage device 106, and the cloud storage system 110 based on speeds (e.g., rates of throughput and/or latency) measured while accessing each of the storage devices. The file system component 118 and/or the hypervisor 214 may determine that the access speed for the local storage device 204 is the fastest and assign a highest rank to the local storage device 204. The file system component 118 and/or the hypervisor 214 may determine that the access speed for the external storage device 104 is the next fastest and assign a next highest rank to the external storage device 104. The file system component 118 and/or the hypervisor 214 may determine that the access speed for the network shared storage device 106 is the next fastest and assign a next highest rank to the network shared storage device 106. The file system component 118 and/or the hypervisor 214 may determine that the access speed for the cloud storage system 110 is the next fastest and assign a next highest rank to the cloud storage system 110.

Due to changing loads on the networks and computer systems in the systems 100 and 200, the file system component 118 and/or the hypervisor 214 may subsequently determine that the access speed for the cloud storage system 110 has become faster than the access speed for the network shared storage device 106 and changes the ranks of the storage devices accordingly. The file system component 118 and/or the hypervisor 214 may move external data files from the cloud storage system 110 to the network shared storage device 106 and vice versa up to any limit on the available storage capacities of the cloud storage system 110 and the network shared storage device 106.

The process 300b may include receiving requests to access the sparse files, at box 314, receiving metadata for the sparse files, at box 316, and providing access to the corresponding external data files, at box 318, as described with respect to the process 300a. If no request to access the sparse files is received or after the providing access to the external data files, the process 300b may include collecting the usage information again, at box 322, and may include collecting the access speeds again.

For simplicity of explanation, the processes of this disclosure are depicted and described as a series of acts. However, acts in accordance with this disclosure can occur in various orders and/or concurrently, and with other acts not presented and described herein. Furthermore, not all illustrated acts may be required to implement the processes in accordance with the disclosed subject matter. In addition, those skilled in the art will understand and appreciate that the processes could alternatively be represented as a series of interrelated states via a state diagram or events. Additionally, it should be appreciated that the processes disclosed in this specification are capable of being stored on an article of manufacture to facilitate transporting and transferring such processes to computing devices. The term "article of manufacture," as used herein, is intended to encompass a computer program accessible from a computer-readable device or storage media.

Figure 4:
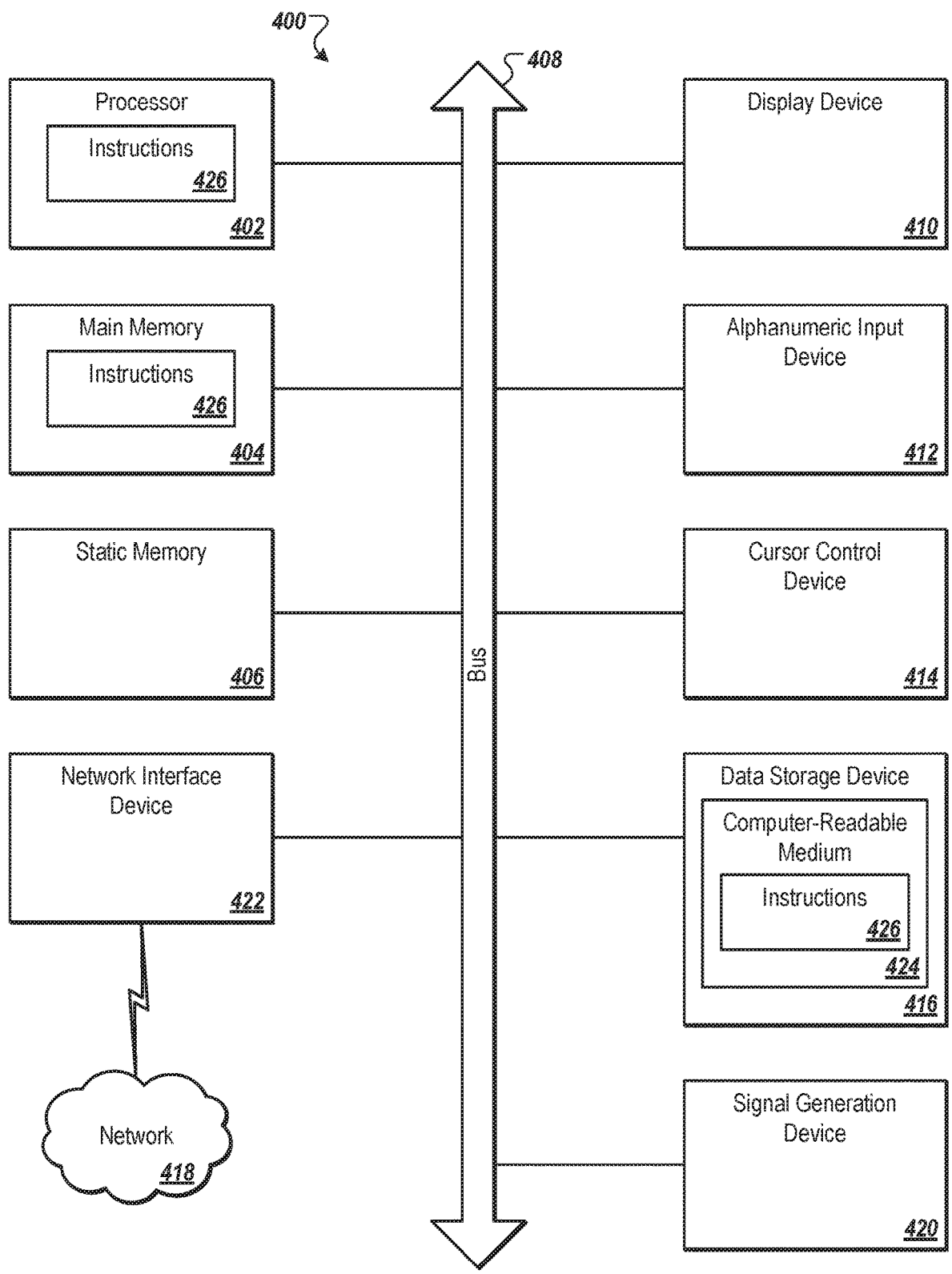
FIG. 4 is a schematic diagram that shows an example of a computing system.

FIG. 4 is a schematic diagram that shows an example of a machine in the form of a computer system 400. The computer system 400 executes one or more sets of instructions 426 that cause the machine to perform any one or more of the methodologies discussed herein. The machine may operate in the capacity of a server or a client machine in client-server network environment, or as a peer machine in a peer-to-peer (or distributed) network environment. The machine may be a personal computer (PC), a tablet PC, a set-top box (STB), a personal digital assistant (PDA), a mobile telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute the sets of instructions 426 to perform any one or more of the methodologies discussed herein.

The computer system 400 includes a processor 402, a main memory 404 (e.g., read-only memory (ROM), flash memory, dynamic random access memory (DRAM) such as synchronous DRAM (SDRAM) or Rambus DRAM (RDRAM), etc.), a static memory 406 (e.g., flash memory, static random access memory (SRAM), etc.), and a data storage device 416, which communicate with each other via a bus 408.

The processor 402 represents one or more general-purpose processing devices such as a microprocessor, central processing unit, or the like. More particularly, the processor 402 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 402 may also be one or more special-purpose processing devices such as an application specific integrated circuit (ASIC), a field programmable gate array (FPGA), a digital signal processor (DSP), network processor, or the like. The processor 402 is configured to execute instructions of the host operating system 202, the guest operating system 116, the hypervisor 214, and/or the file system component 118 for performing the operations and steps discussed herein.

The computer system 400 may further include a network interface device 422 that provides communication with other machines over a network 418, such as a local area network (LAN), an intranet, an extranet, or the Internet. The computer system 400 also may include a display device 410 (e.g., a liquid crystal display (LCD) or a cathode ray tube (CRT)), an alphanumeric input device 412 (e.g., a keyboard), a cursor control device 414 (e.g., a mouse), and a signal generation device 420 (e.g., a speaker).

The data storage device 416 may include a computer-readable storage medium 424 on which is stored the sets of instructions 426 of the host operating system 202, the guest operating system 116, the hypervisor 214, and/or the file system component 118 embodying any one or more of the methodologies or functions described herein. The sets of instructions 426 of the host operating system 202, the guest operating system 116, the hypervisor 214, and/or the file system component 118 may also reside, completely or at least partially, within the main memory 404 and/or within the processor 402 during execution thereof by the computer system 400, the main memory 404 and the processor 402 also constituting computer-readable storage media. The sets of instructions 426 may further be transmitted or received over the network 418 via the network interface device 422.

While the example of the computer-readable storage medium 424 is shown as a single medium, the term "computer-readable storage medium" can include a single medium or multiple media (e.g., a centralized or distributed database, and/or associated caches and servers) that store the sets of instructions 426. The term "computer-readable storage medium" can include any medium that is capable of storing, encoding or carrying a set of instructions for execution by the machine and that cause the machine to perform any one or more of the methodologies of the present disclosure. The term "computer-readable storage medium" can include, but not be limited to, solid-state memories, optical media, and magnetic media.

In the foregoing description, numerous details are set forth. It will be apparent, however, to one of ordinary skill in the art having the benefit of this disclosure, that the present disclosure may be practiced without these specific details. In some instances, well-known structures and devices are shown in block diagram form, rather than in detail, in order to avoid obscuring the present disclosure.

Some portions of the detailed description have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, it is appreciated that throughout the description, discussions utilizing terms such as "identifying", "providing", "enabling", "finding", "selecting" or the like, refer to the actions and processes of a computer system, or similar electronic computing device, that manipulates and transforms data represented as physical (e.g., electronic) quantities within the computer system memories or registers into other data similarly represented as physical quantities within the computer system memories or registers or other such information storage, transmission or display devices.

The present disclosure also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including a floppy disk, an optical disk, a compact disc read-only memory (CD-ROM), a magnetic-optical disk, a read-only memory (ROM), a random access memory (RAM), an erasable programmable read-only memory (EPROM), an electrically erasable programmable read-only memory (EEPROM), a magnetic or optical card, or any type of media suitable for storing electronic instructions.

The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. The terms "first," "second," "third," "fourth," etc. as used herein are meant as labels to distinguish among different elements and may not necessarily have an ordinal meaning according to their numerical designation.

It is to be understood that the above description is intended to be illustrative, and not restrictive. Other implementations will be apparent to those of skill in the art upon reading and understanding the above description. The scope of the disclosure should, therefore, be determined with reference to the appended claims, along with the full scope of equivalents to which such claims are entitled.

In situations in which the systems discussed here collect personal information about users, or may make use of personal information, the users may be provided with an opportunity to control whether the host operating system 202, the guest operating system 116, the hypervisor 214, and/or the file system component 118 collect user information (e.g., a user's current location). In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by the host operating system 202, the guest operating system 116, the hypervisor 214, and/or the file system component 118.

What is claimed is:

1. A method comprising:

executing, by a processing device of a computer system, a hypervisor to manage one or more virtual machines that each include a guest operating system, wherein the guest operating system comprises a guest file system and supports an access to the virtual machine from a client device;

receiving, by the processing device, from within the guest operating system, a request to store a first data file in the guest file system;

in response to receiving the request to store the first data file:
  storing the first data file in a first storage device for a file system outside the guest file system, the first data file having a first file path in a folder structure of the file system outside the guest file system;
  storing a second data file in the guest file system, wherein the second data file is a sparse file for the first data file, the second data file having a second file path in a folder structure of the guest file system, wherein the second file path shares a common portion with the first file path; and
  storing metadata for the second data file, wherein the metadata directs requests to access the second data file from within the guest operating system to the first data file stored in the first storage device, the metadata comprising an identifier of the common portion for determining a location of the second data file;
receiving, from within the guest operating system, a plurality of requests to access the second data file;
responsive to each of the plurality of requests, accessing the first data file using the metadata for the second data file;
storing a record of the requests to access the second data file;
identifying, based on the stored record, an access frequency of the requests to access the second data file; and
moving, based on the access frequency, the first data file from the first storage device outside the guest file system to a second storage device outside the guest file system.

2. The method of claim 1, wherein the second file is empty.

3. The method of claim 1, wherein the first storage device is of a first type of a plurality of storage device types, the second storage device is of a second type of the plurality of storage device types, and the plurality of storage device types comprises a local storage device within the computer system, an external storage device connected to the computer system, a network shared storage device in communication with the computer system over a network, and a cloud storage system in communication with the computer system.

4. The method of claim 1, wherein the second storage device has a higher speed of access than the first storage device, and wherein moving the first data file is in response to determining that the access frequency is higher than a threshold frequency.

5. The method of claim 1, wherein the second storage device has a lower speed of access than the first storage device, and wherein moving the first data file is in response to determining that the access frequency is lower than a threshold frequency.

6. The method of claim 1, further comprising measuring a speed of access of the first storage device and a speed of access of the second storage device, and wherein moving the first data file is further based on the speed of access of the first storage device being lower than the speed of access of the second storage device.

7. The method of claim 6, further comprising:
  measuring, at a later time, the speed of access of the first storage device and the speed of access of the second storage device; and
  returning the first data file from the second storage device to the first storage device based on, as measured at the later time, the speed of access of the first storage device being higher than the speed of access of the second storage device.

8. A non-transitory computer-readable medium having instructions stored thereon that, when executed by a computer system, cause the computer system to:
  execute a hypervisor to manage one or more virtual machines that each include a guest operating system, wherein the guest operating system comprises a guest file system and supports an access to the virtual machine from a client device;
  receive, from within the guest operating system, a request to store a first data file in the guest file system;
  in response to receiving the request to store the first data file:
    store the first data file in a first storage device for a file system outside the guest file system, the first data file having a first file path in a folder structure of the file system outside the guest file system; and
    store a second data file in the guest file system, wherein the second data file is a sparse file for the first data file, the second data file having a second file path in a folder structure of the guest file system, wherein the second file path shares a common portion with the first file path; and
    store metadata for the second data file, wherein the metadata directs requests to access the second data file from within the guest operating system to the first data file stored in the first storage device, the metadata comprising an identifier of the common portion for determining a location of the second data file;
  receive, from within the guest operating system a plurality of requests to access the second data file;
  responsive to each of the plurality of requests, access the first data file using the metadata for the second data file;
  store a record of the requests to access the second data file;
  identify, based on the stored record, an access frequency of the requests to access the second data file; and
  move, based on the access frequency, the first data file from the first storage device outside the guest file system to a second storage device outside the guest file system.

9. The computer-readable medium of claim 8, wherein the second file is empty.

10. The computer-readable medium of claim 8, wherein the first storage device is of a first type of a plurality of storage device types, the second storage device is of a second type of the plurality of storage device types, and the plurality of storage device types comprises a local storage device within the computer system, an external storage device connected to the computer system, a network shared storage device in communication with the computer system over a network, and a cloud storage system in communication with the computer system.

11. The computer-readable medium of claim 8, wherein the second storage device has a higher speed of access than the first storage device, and wherein to move the first data file the instructions are further to cause the computing system to determine that the access frequency is higher than a threshold frequency.

12. The computer-readable medium of claim 8, wherein the second storage device has a lower speed of access than the first storage device, and wherein to move the first data file the instructions are further to cause the computing system to determine that the access frequency is lower than a threshold frequency.

13. The computer-readable medium of claim 8, wherein the instructions are further to cause the computer system to measure a speed of access of the first storage device and a speed of access of the second storage device, and wherein moving the first data file is further based on the speed of access of the first storage device being lower than the speed of access of the second storage device.

14. The computer-readable medium of claim 13, wherein the instructions are further to cause the computer system to:
   measure, at a later time, the speed of access of the first storage device and the speed of access of the second storage device; and
   return the first data file from the second storage device to the first storage device based on, as measured at the later time, the speed of access of the first storage device being higher than the speed of access of the second storage device.

15. A computer system comprising:
a memory that stores instructions; and
a processing device to execute the instructions to:
execute a hypervisor to manage one or more virtual machines that each include a guest operating system, wherein the guest operating system comprises a guest file system and supports an access to the virtual machine from a client device;
receive, from within the guest operating system, a request to store a first data file in the guest file system;
in response to receiving the request to store the first data file:
   store the first data file in a first storage device for a file system outside the guest file system, the first data file having a first file path in a folder structure of the file system outside the guest file system; and
   store a second data file in the guest file system, wherein the second data file is a sparse file for the first data file, the second data file having a second file path in a folder structure of the guest file system, wherein the second file path shares a common portion with the first file path; and
   store metadata for the second data file, wherein the metadata directs requests to access the second data file from within the guest operating system to the first data file stored in the first storage device, the metadata comprising an identifier of the common portion for determining a location of the second data file;

receive, from within the guest operating system, a plurality of requests to access the second data file;
responsive to each of the plurality of requests, access the first data file using the metadata for the second data file;
store a record of the requests to access the second data file;
identify, based on the stored record, an access frequency of the requests to access the second data file; and
move, based on the access frequency, the first data file from the first storage device outside the guest file system to a second storage device outside the guest file system.

16. The computer system of claim 15, wherein the first storage device is of a first type of a plurality of storage device types, the second storage device is of a second type of the plurality of storage device types, and the plurality of storage device types comprises a local storage device within the computer system, an external storage device connected to the computer system, a network shared storage device in communication with the computer system over a network, and a cloud storage system in communication with the computer system.

17. The computer system of claim 15, wherein the second storage device has a higher speed of access than the first storage device, and wherein to move the first data file the processing device is to determine that the access frequency is higher than a threshold frequency.

18. The computer system of claim 15, wherein the second storage device has a lower speed of access than the first storage device, and wherein to move the first data file the processing device is to determine that the access frequency is lower than a threshold frequency.

19. The computer system of claim 15, wherein the processing device is further to execute the instructions to measure a speed of access of the first storage device and a speed of access of the second storage device, and wherein moving the first data file is further based on the speed of access of the first storage device being lower than the speed of access of the second storage device.

20. The computer system of claim 19, wherein the processing device is further to execute the instructions to:
   Measure, at a later time, the speed of access of the first storage device and the speed of access of the second storage device; and
   return the first data file from the second storage device to the first storage device based on, as measured at the later time, the speed of access of the first storage device being higher than the speed of access of the second storage device.

* * * * *